Nov. 24, 1953  J. KLEIN  2,659,922
OIL GAUGE WIPER
Filed July 6, 1949
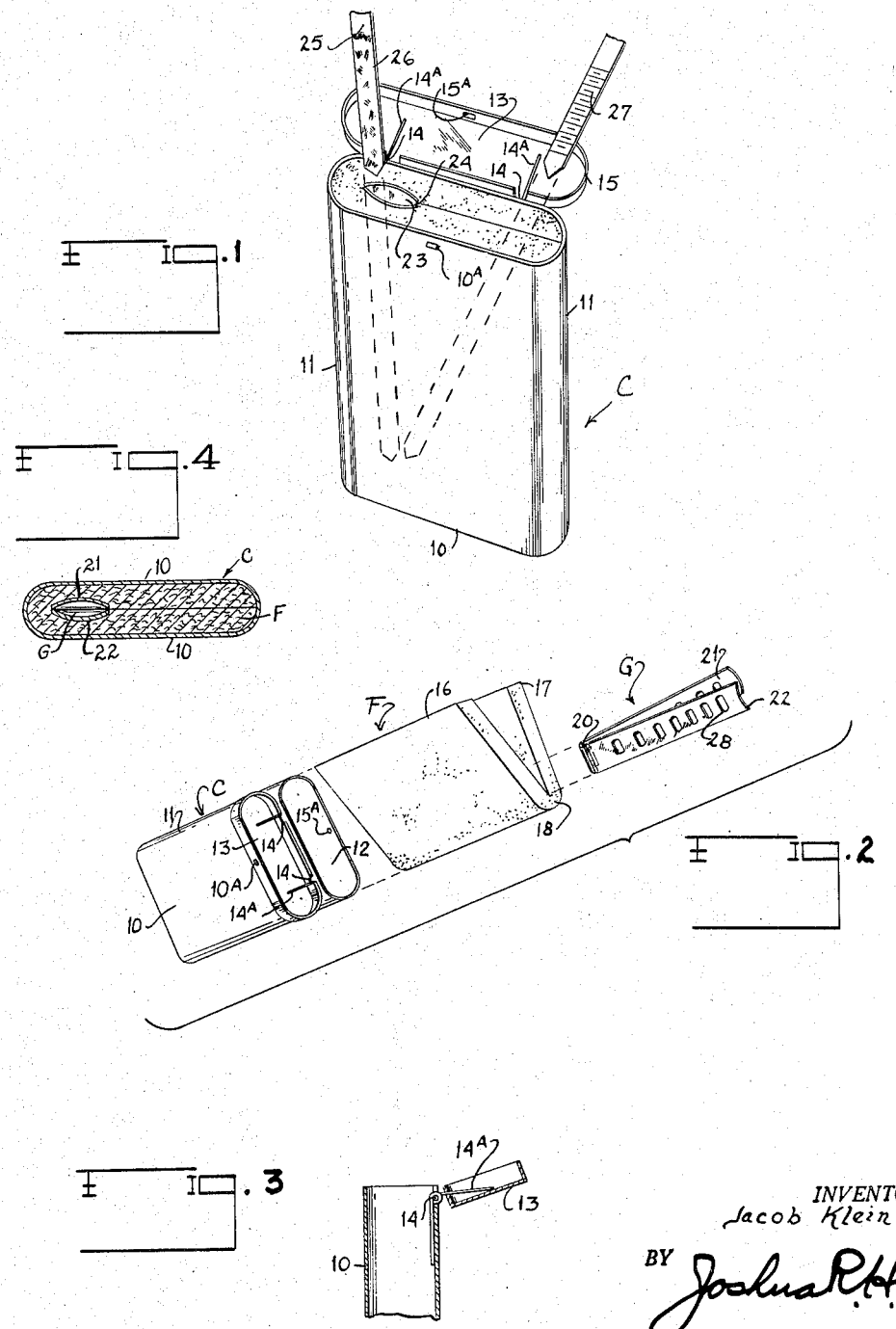
INVENTOR.
Jacob Klein
BY Joshua R. H. Potts
His Attorney Patented Nov. 24, 1953

2,659,922

UNITED STATES PATENT OFFICE 2,659,922

OIL GAUGE WIPER

Jacob Klein, Fresno, Calif.

Application July 6, 1949, Serial No. 103,227

6 Claims. (Cl. 15—210)

The present invention relates to an oil gauge wiper and is concerned primarily with a device of simple construction which greatly facilitates the wiping clean of an oil gauge.

At the present time just about every modern automobile includes an oil gauge which is availed of from time to time to determine whether there is a proper amount of oil in the crank case of the engine. Such an oil gauge consists essentially of a thin blade with a handle at one end and the blade must be wiped clean before the gauge can be used. At the present time it is common practice for service station attendants, mechanics, and others handling the oil gauges to employ rags or waste for the purpose of wiping off the gauges. In many instances, oil splashes off the gauges, and the rags or waste themselves are not only expensive but constitute a severe fire hazard. If the attendant places the soiled rags in his pocket to have them available for instant use, he will soil his clothing, but if he lays the rag to one side he loses time in locating it when needed. Taken as a whole, this practice of using rags or waste is highly undesirable and is intended to be improved by this invention.

The present invention has in view as its foremost objective the provision of an oil gauge wiper which consists essentially of two complemental pieces of felt that are compressed into a compact mass with a metallic guide which facilitates the entrance of an oil gauge into the felt mass.

More in detail the invention has as an object the provision of an oil gauge wiper of the type indicated, which consists of a piece of felt of appreciable thickness that is folded upon itself to provide two abutting faces. Between these faces, there is interposed a metallic guide which provides a tubular passage adapted to receive an oil gauge. One or both of the side edges of this guide is open so as to permit the gauge to be removed from the guide and into the felt mass where the latter performs the wiping action as the gauge is withdrawn therefrom. The felt, together with the guide therein, is compressed within a suitable container having an open top which exposes one end of the tubular guide and one edge of the meeting faces.

Various other more detailed objects and advantages of the invention such as arise in connection with carrying out the above noted ideas in a practical embodiment will, in part become apparent, and in part be hereinafter stated as the description of the invention proceeds.

The invention, therefore, comprises an oil gauge wiper that consists essentially of a container which receives a piece of felt that is folded to provide abutting faces with a tubular guide positioned between the abutting faces and having an open side edge communicating therewith.

For a full and more complete understanding of the invention, reference may be had to the following description and accompanying drawing wherein:

Figure 1 is a perspective view of an oil gauge wiper designed in accordance with the precepts of this invention;

Figure 2 is an other perspective view developing the several elements of the wiper in exploded relation;

Figure 3 is an enlarged detailed view in section illustrating the arrangement for spring biasing the cover; and Figure 4 is a section through the wiper taken on a plane parallel to that of the open top.

Referring now to the drawing wherein like reference characters denote corresponding parts, the wiper of this invention is shown as comprising three main parts. These are a container that is referred to in its entirety by the reference character C, a piece of felt designated F, and a guide identified as G.

The container C is preferably made from thin sheet metal such as is commonly employed in the making of cans. It comprises a main body portion that is defined by opposed flat walls 10 that are spaced apart and joined by curved edge walls 11. This main body portion 10 is closed by a bottom at one end, and its upper end such as indicated at 12 is normally open. Hingedly secured to the upper edge of one of the side walls 10 at the open end 12 is a cover 13 with the hinged connections being indicated at 14. The cover 13 may carry a peripheral flange 15 that is adapted to overlap the upper edge portions about the open top 12. Coiled around the hinge pintle 14 is a torsion spring 14-A arranged and adapted to open the cover 13 when the upper portion of the front wall 10 is pressed inwardly to permit the boss 10-A to disengage the recess 15-A carried by the front wall of peripheral flange 15. The boss 10A and recess 15A cooperate to form a detent.

Because of the foregoing construction, an attendant finds it frequently necessary to press inwardly on the front wall 10 with one hand in order to open the device for instant use.

The felt F is folded upon itself to provide a slit or two portions arranged in face to face abutting relation with respect to each other, and the guide G is positioned in the slit and has an open side edge communicating with the slit; or the guide G may be said to be positioned between the two portions and has one open side edge communicating with the abutting faces of the two portions.

More specifically, the felt F consists of a large piece of a felt sheet that is of appreciable thickness and which is folded to provide two portions 16 and 17 that are joined by a bend 18. It will be noted that the portions 16 and 17 are arranged in face to face abutting relation with respect to each other. The felt F with the portions 16 and 17 folded together and tightly compressed is received in the container C.

The tubular guide G is positioned in the fold between the portions 16 and 17 at the bend 18 and comprises a long strip of metal having a concavo-convex formation from end to end that is folded at the bend 20 to provide complemental halves 21 and 22 which, when in assembled relation, present an open mouth as at 23. It will be seen that when the guide G is positioned between the portions 16 and 17 of the felt F there are two pairs of meeting side edges forming slits, one of which opens onto the slit 19 as indicated at 24. Each of the members 21 and 22 may be formed with a series of elongated slots 28.

Operation

While the manner of using the oil gauge wiper, hereinbefore described, is believed to be obvious from the illustration in the drawing, and the description of the parts given, it may be noted that an oil gauge ordinarily includes as an essential element a blade 25 which is covered by oil as shown at 26 which must be wiped clean from the blade if the indicia 27 is to be visible. The blade 25 covered with the oil 26 is inserted into the tubular guide G through the open mouth at 23, and the insertion is continued until the entire blade, or at least as much thereof as is covered with the oil, is received within the guide G. The blade is now moved laterally through the open side edge 24 so that it is received between the meeting faces of the felt portions 16 and 17.

Due to the felt F being under a high degree of compression, the felt is compressed against the faces of the blade 25, and the latter is now withdrawn upwardly so as to emerge from the slit 19. As this upward movement takes place the oil 26 is wiped clean and is absorbed by the felt. Some of the oil 26 may drop off of the blade 25 while the latter is within the tubular guide G. However, such oil will pass through the openings 28 and will become absorbed by the felt F.

It has been found that a felt mass which is capable of being compressed into a container of convenient size is capable of absorbing a relatively large amount of oil. From actual tests it has been found that a wiper having a size comparable to the conventional tin in which tobacco is sold and which may readily be carried about in a pocket of an attendant's uniform has been used for one hundred and fifty wipings, and the last wiping cleaned the oil from the gauge just as thoroughly as the first with no apparent deterioration in the ability of the felt to absorb the oil.

Obviously, when one of the felts becomes saturated, it may be washed in gasoline or benzine and be inserted in the container for use until another cleansing operation is desirable.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In an oil gauge wiper, the combination of: a container defined by opposed spaced flat walls and curved edge walls and having a closed bottom and an open top, a piece of felt folded to provide a folded edge engaging one of said curved walls and two portions in face to face abutting relation with respect to each other to form a slit between said faces with said slit being disposed between and parallel to said flat walls, said portions being compressed within said container, and a tubular guide of oval cross section having an open end located substantially at the open top of said container and having meeting side edges forming a slit communicating with the slit at the abutting faces of said portions.

2. In an oil gauge wiper, the combination of: a container defined by opposed spaced flat walls and curved edge walls and having a closed bottom and an open top, a piece of felt folded to provide a folded edge engaging one of said curved walls and two portions in face to face abutting relation with respect to each other to form a slit between said faces with the slit being between and parallel to said flat walls, said portions being compressed within said container, and a tubular guide comprising complemental halves integrally joined by a bend and when assembled defining a passage of oval cross section having an open end at said open top, said halves presenting slits at their meeting side edges, one of which communicates with the slit at the abutting faces of said portions.

3. In an oil gauge wiper, the combination of: a container defined by opposed spaced flat walls and curved edge walls and having a closed bottom and an open top, a piece of felt folded to provide a folded edge engaging one of said curved walls and two portions in face to face abutting relation with respect to each other thereby forming a slit between said faces with the slit being between and parallel to said flat walls, said portions being compressed within said container, a tubular guide comprising complemental halves integrally joined by a bend and when assembled defining a passage of oval cross section having an open end at said open top, said halves presenting slits at their meeting side edges, one of which communicates with the slit at the abutting faces of said portions, and a cover hingedly connected to one of said flat walls.

4. In an oil gauge wiper, the combination of: a container having a main body portion that is closed at one end and open at the other, a felt mass substantially filling said container and having a slit therein that is substantially normal to the plane of the open end of said container, a tubular guide positioned in said slit in said felt mass and having an open mouth located substantially at said open end, said guide having meeting side edges forming slits, one of which communicates with said slit in said felt mass, a cover for the open end of said container hingedly mounted thereon, and spring means normally urging said cover into an open position.

5. In an oil gauge wiper, the combination of: a container defined by opposed spaced flat walls and curved edge walls and having a closed bottom and an open top, a piece of felt folded to provide a folded edge engaging one of said curved walls and two portions in face to face abutting relation with respect to each other to form a slit between and parallel to said flat walls, said portions being compressed within said container, a tubular guide of oval cross section having an open end located substantially at the open top of said container and having meeting side edges forming slits one of which communicates with the slit at the abutting faces of said portions, a cover for the open top of said container, said cover having a depending peripheral flange adapted to engage the portions of said flat walls adjacent to the open top of said container, hinge means mounting said cover on said container, and torsion spring means associated with said hinge means and normally urging said cover into open position.

6. In an oil gauge wiper, the combination of: a container defined by opposed front and rear flat walls and curved edge walls and having a closed bottom and an open top, a piece of felt folded to provide a folded edge engaging one of said curved walls and two portions in face to face abutting relation with respect to each other to form a slit between and parallel to said flat walls, said portions being compressed within said container, a tubular guide having an open end located substantially at the open top of said container and having meeting side edges forming slits one of which communicates with the slit at the abutting faces of said portions, a cover for the open top of said container, said cover having a depending peripheral flange adapted to overlap the portions of the container walls adjacent to said container open top, hinge means mounting said cover of said rear wall, torsion spring means associated with said hinge means and normally urging said cover into an open position, and cooperating elements of a detent on said front wall and said flange for maintaining said cover in closed position.

JACOB KLEIN.

References Cited in the file of this patent

UNITED STATES PATENTS

| Number | Name | Date |
|---|---|---|
| 1,652,875 | Rein et al. | Dec. 13, 1927 |
| 1,839,026 | Gray et al. | Dec. 29, 1931 |
| 2,187,491 | Fleckenstine | Jan. 16, 1940 |
| 2,228,845 | Picinich | Jan. 14, 1941 |
| 2,439,171 | Kreider | Apr. 6, 1948 |
| 2,453,452 | Nielsen | Nov. 9, 1948 |